June 19, 1923.
J. A. HARDEN
BOLL WEEVIL EXTERMINATOR
Filed Oct. 16, 1922
1,459,626
4 Sheets-Sheet 1
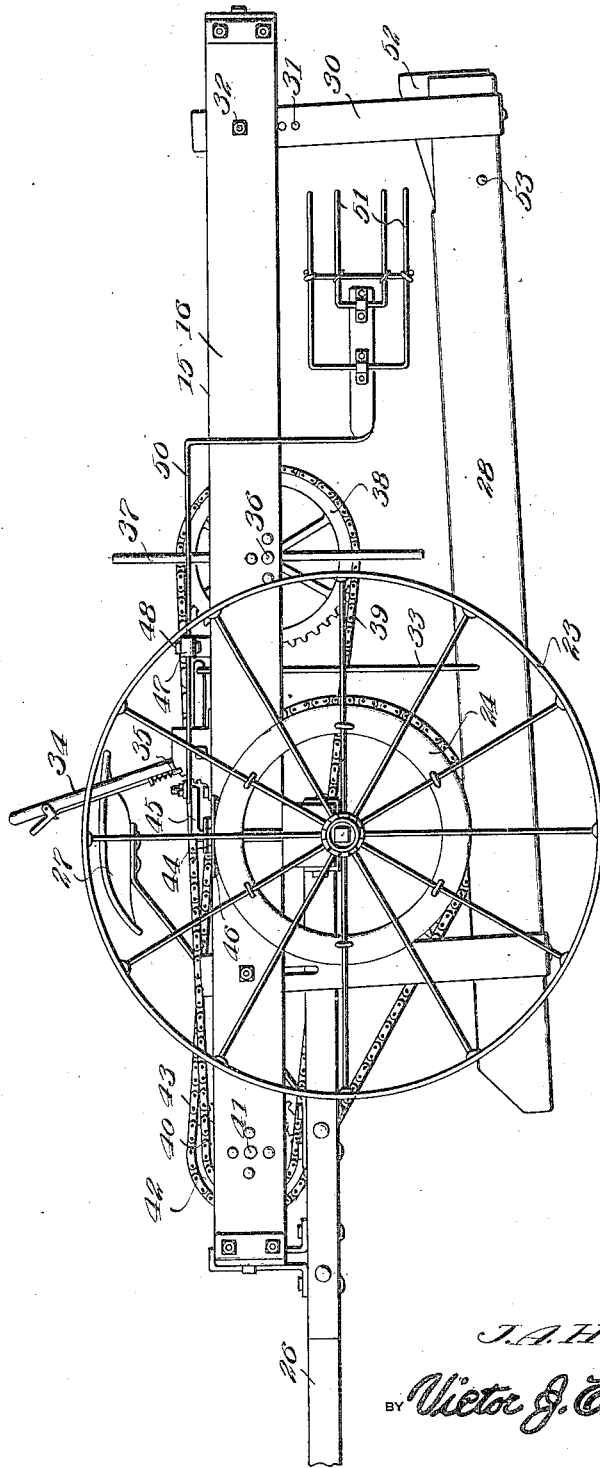

June 19, 1923.
J. A. HARDEN
BOLL WEEVIL EXTERMINATOR
Filed Oct. 16, 1922
1,459,626
4 Sheets-Sheet 2
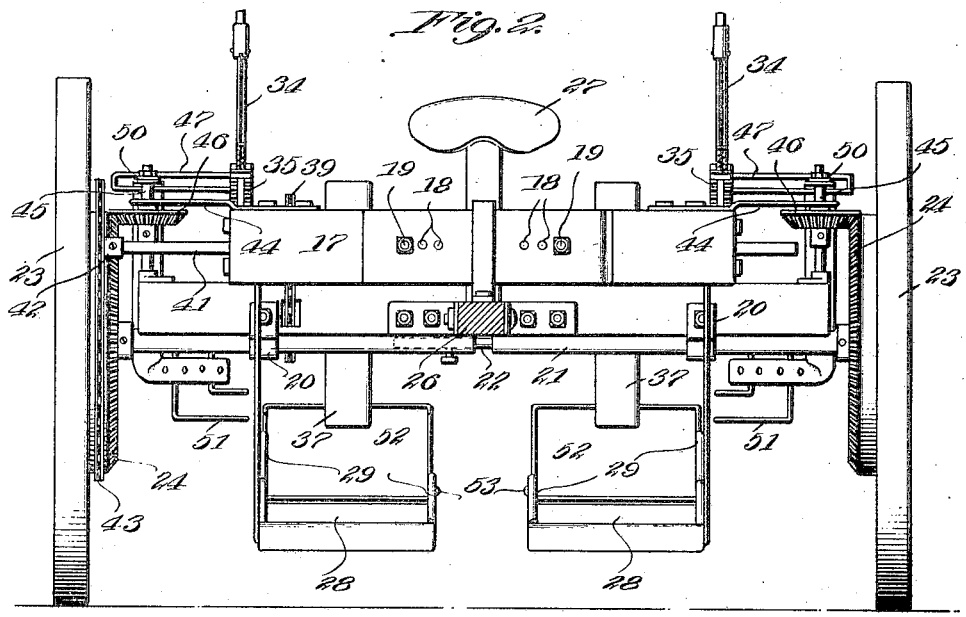
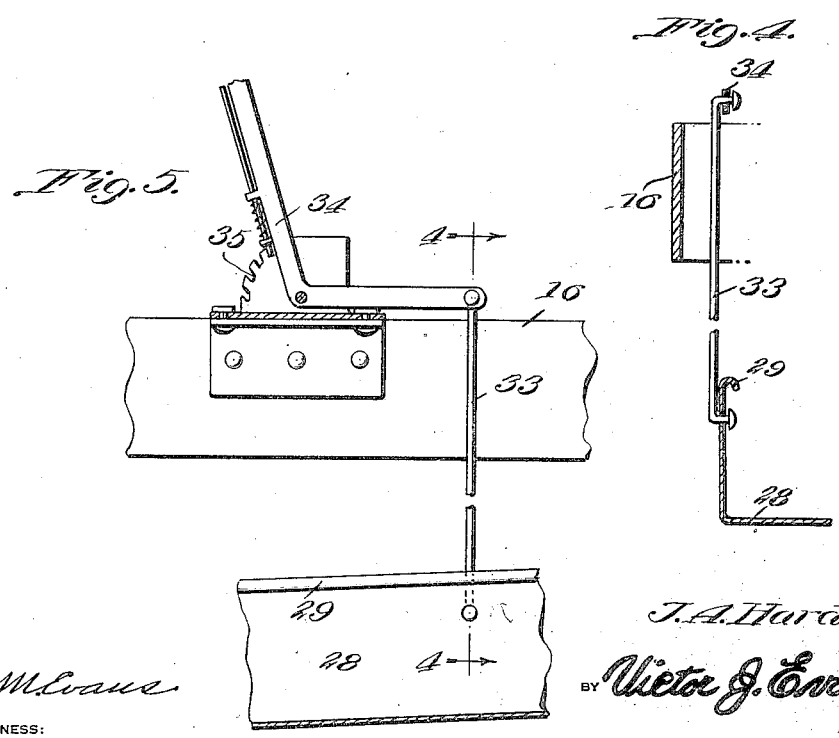

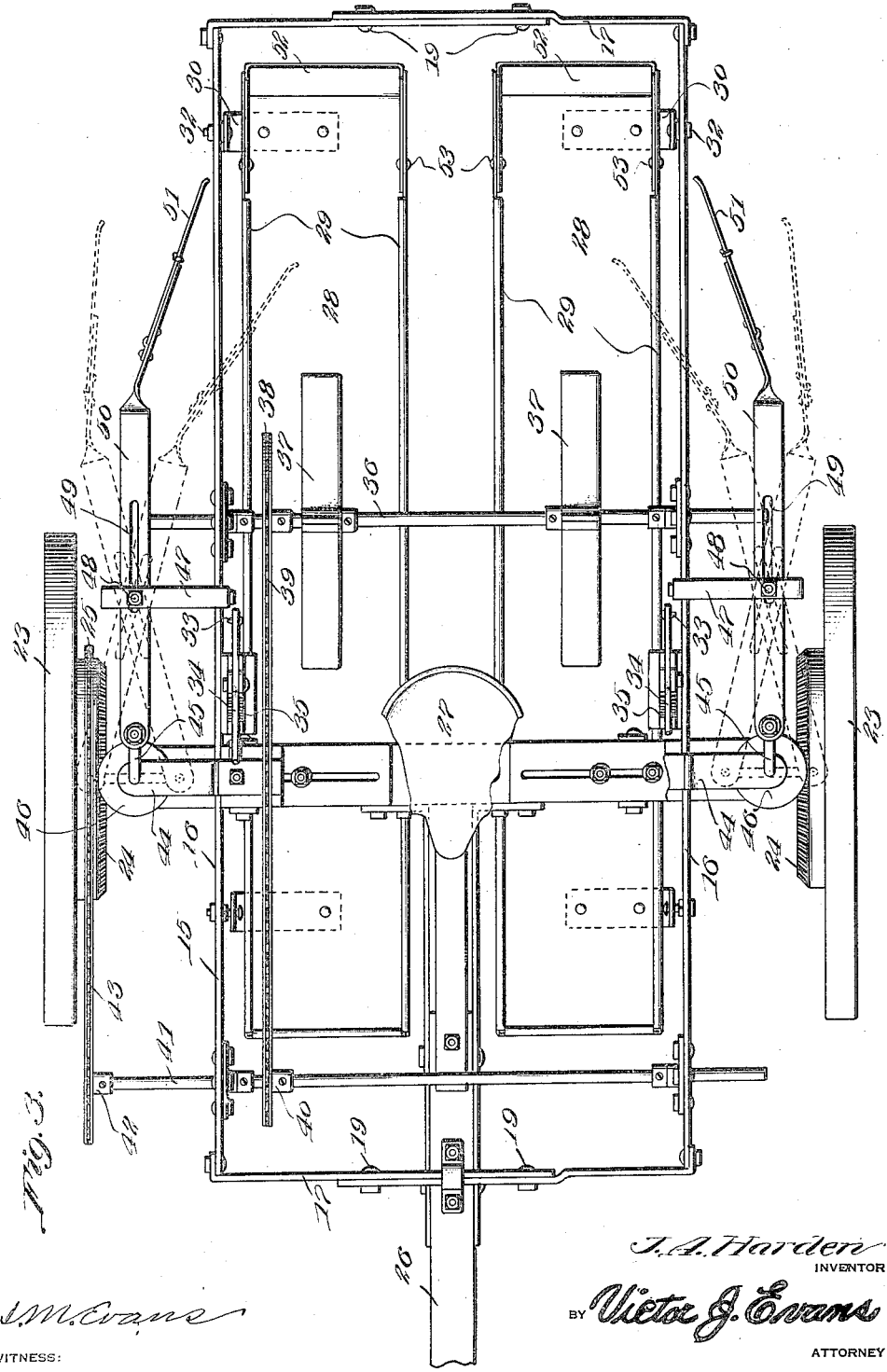

June 19, 1923.
J. A. HARDEN
BOLL WEEVIL EXTERMINATOR
Filed Oct. 16, 1922  4 Sheets-Sheet 4
1,459,626
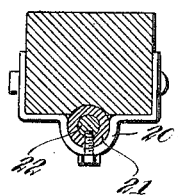
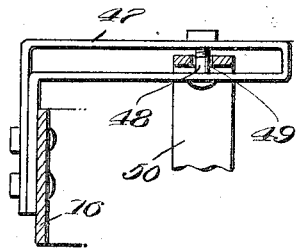
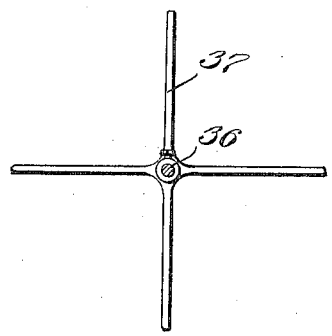
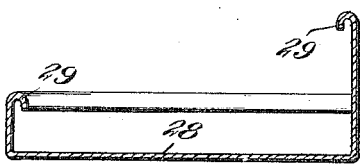
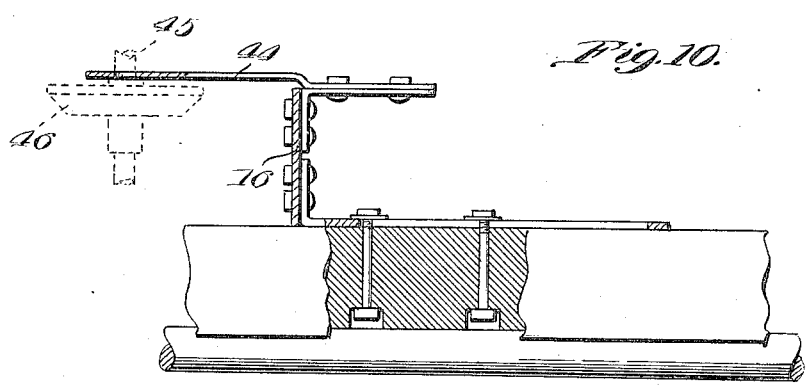

Patented June 19, 1923.

1,459,626

UNITED STATES PATENT OFFICE.

JAMES A. HARDEN, OF ADA, OKLAHOMA.

BOLL-WEEVIL EXTERMINATOR.

Application filed October 16, 1922. Serial No. 594,907.

*To all whom it may concern:*

Be it known that I, JAMES A. HARDEN, a citizen of the United States, residing at Ada, in the county of Pontotoc and State of Oklahoma, have invented new and useful Improvements in Boll-Weevil Exterminators, of which the following is a specification.

This invention relates to insect destroying devices and has for its object the provision of a novel machine designed to be drawn along the ground in straddling relation over a row of cotton and provided with means whereby to knock off and collect the weevils and punctured squares so that they may be subsequently destroyed.

An important object is the provision of a device of this character which is provided with positively driven beaters which will operate to brush against the plants for knocking off the weevils and squares.

Another object is the provision of a device of this character in which the collector pans are adjustably mounted and in which means is provided for elevating these pans when the machine is making a turn or when the machine must pass over a stump, stone or other obstruction.

A further object is the provision of a machine of this character in which the entire device is adjustable as to width whereby it may be conveniently used for treating young plants or those which have become more bushy and which require the pans to be more greatly separated to avoid injuring the stalks.

An additional object is the provision of a device of this character which will be comparatively simple and inexpensive in manufacture, easy to operate and control, positive in action, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of the machine,

Figure 2 is a front view,

Figure 3 is a top plan view showing the outside beaters as being in one limit of their movement, Figure 4 is a section on the line 4—4 of Figure 5, Figure 5 is a longitudinal section taken along one side bar of the frame and showing the lever means for raising and lowering the pans, Figure 6 is a cross section taken through the axle, Figure 7 is a detail cross section showing the mounting for the outside beaters, Figure 8 is a cross section taken through the paddle shaft, Figure 9 is a detail section through one of the pans and Figure 10 is a detail sectional view showing one of the driving gear brackets.

Referring more particularly to the drawings the numeral 15 designates broadly the supporting frame of the device, which frame is here illustrated as being rectangular in shape and including side bars 16 connected by front and rear cross bars 17. These cross bars 17 are formed of overlapping sections each of which is formed with a plurality of holes 18 through which are passed bolts 19 for holding the sections together. By this construction it will be seen that the width of the entire frame may be varied to meet different requirements or conditions. The side bars 16 of the frame carry bearings 20 within which is journaled an axle 21 which is formed of slidably connected sections 22 whereby the length of the axle may be varied to correspond with the adjustment of the frame. The ends of the axle sections carry ground engaging wheels 23 against both of which are secured beveled gears 24 and upon one of which is mounted a sprocket 25.

The numeral 26 designates a draft tongue by means of which the device may be pulled along a field and carried by this tongue; at the rear end thereof is a seat 27 for the operator.

Adjustably mounted below the frame 15 are two spaced elongated pans 28 which preferably have their edges inturned or rolled as shown at 29 to prevent any weevils knocked into the pans from crawling out. At their rear ends the pans are secured to bars 30 which extend upwardly and which are formed with holes 31 through selected ones of which pass bolts 32 which pass through the side bars 16 of the frame for the purpose of pivotally mounting the pans in an adjustable manner. Pivotally connected with the forward end portions of these pans are links 33 which extend upwardly and which are pivotally connected with levers 34 which are pivoted on the frame and which co-operate with catches 35 which will hold the levers in selected positions with the pans either in raised or lowered position as may be desired. The raising of the pans is desirable when the machine turns at the end of a row or in case it is necessary to pass over a stump or other obstruction in the field.

Journaled through the side bars 16 is a transverse shaft 36 which carries paddles 37 located above the pans and rotated by means of a sprocket 38 on the shaft 36 over which is trained a chain 39 which is in turn trained about a sprocket 40 on a counter shaft 41 journaled at the front of the frame. This counter shaft carries a sprocket 42 engaged by a chain 43 which is trained about the sprocket 25. By this connection it will be seen that when the device is drawn along the paddles will be rotated to beat the plants and knock off the weevils.

Extending beyond the sides of the main frame are brackets 44 on which are journaled crank shafts 45 which carry pinions 46 meshing with the gears 24. Secured to the side bars 16 are other brackets 47 carrying bolts 48 which pass through elongated slots 49 in elongated arms 50 which are pivoted on the cranks of the shafts 45. The rear ends of the arms 50 are downturned as shown and carry beaters 51 designed to brush against the plants being treated.

The rear ends of the pans 28 are formed open but are normally closed by U-shaped gate members 52 which are pivoted at 53 and which may be swung up when it is necessary to sweep any accumulations out of the pans, this action being facilitated by operating the levers 34 to raise the forward ends of the pans.

In the operation it will be seen that when the device is drawn along the ground, the rotation of the ground wheels 23 will cause the counter shaft 41 and paddle shaft 36 to be driven. When the device is in operation it is of course to be understood that the levers 34 are in such position that the pans will be lowered so that they will travel close to the ground and immediately at the sides of the row of plants. The rotary movement of the paddles 37 will cause the weevils and punctured squares to be knocked from the plants into the pans. The rotation of the gears 24 will cause rotation of the pinions 46 and the cranks 45 will reciprocate the arms 50 which carry the beaters 51 and at the same time give them lateral swinging movement which will cause the beaters to brush against the plants and knock off the weevils and punctured squares. When quite a quantity of squares and insects has been collected in the pans the rear end gates thereof may be raised and the débris swept out of the pans into sacks or other receptacles and subsequently burned.

A notable feature is the fact that the frame and the supporting axle may be adjusted so that the entire machine may be made wide or narrow depending upon the conditions in the particular field in which the device is to be used. It is also to be observed that the height of the pans may be adjusted irrespective of the lever means for raising and lowering them at different times.

From the foregoing description and a study of the drawings it will be apparent that I have thus provided a simply constructed and very easily operated machine which will be highly efficient for use in destroying boll weevils and punctured squares in a very rapid manner and involving very little labor.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A machine of the character described comprising a supporting frame including side bars and longitudinally adjustable cross bars, an axle formed of longitudinally adjustably connected sections, ground engaging wheels carried by the axle, adjustable and movable pans arranged in spaced relation and suspended from said frame and beater mechanism driven by the wheels, the adjustment of said cross bars and axle permitting variation in the width of the machine to meet various requirements.

2. A machine of the character described comprising a supporting frame, an axle carried thereby, ground engaging wheels on said axle, gears on said wheels, adjustable and movable pans. suspended below the frame, paddle mechanism carried by the frame and driven by one wheel, supporting brackets projecting from the sides of the frame, pinions carried by cranks journaled in said brackets and meshing with said gears, other brackets carried by the frame, and arms pivotally and slidably mounted upon said last named brackets with their forward ends connected with said cranks and with their rear ends carrying beaters designed to brush against a row of plants straddled by the machine.

In testimony whereof I affix my signature.

JAMES A. HARDEN.